Sept. 16, 1941.     C. M. KENDRICK     2,255,784
FLUID PRESSURE DEVICE
Filed May 24, 1940     6 Sheets-Sheet 1

INVENTOR
Charles M. Kendrick
BY
Bartlett Eyre Keel & Weymouth
ATTORNEYS

Sept. 16, 1941.  C. M. KENDRICK  2,255,784
FLUID PRESSURE DEVICE
Filed May 24, 1940  6 Sheets-Sheet 2

INVENTOR
Charles M. Kendrick
BY
Bartlett Eyre Keel & Weymouth
ATTORNEYS

Sept. 16, 1941.　　　C. M. KENDRICK　　2,255,784
FLUID PRESSURE DEVICE
Filed May 24, 1940　　6 Sheets-Sheet 3
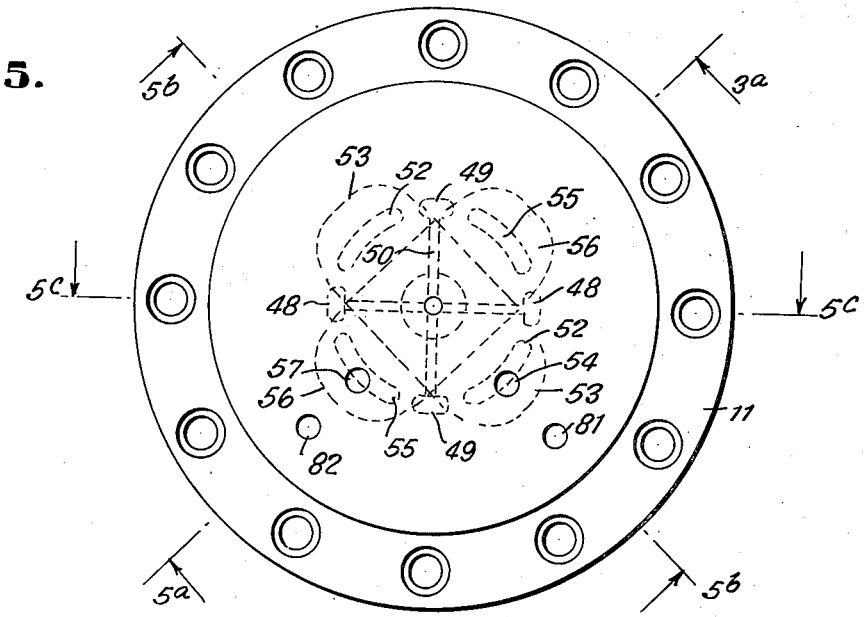
Fig. 5.
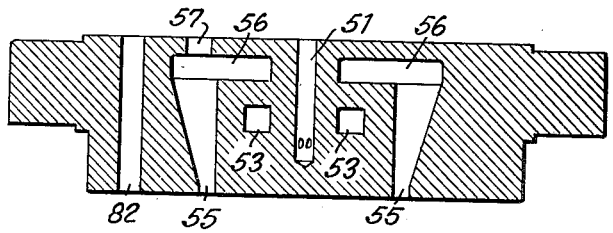
Fig. 5ᵃ.
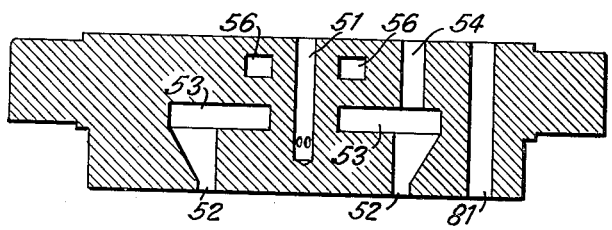
Fig. 5ᵇ.
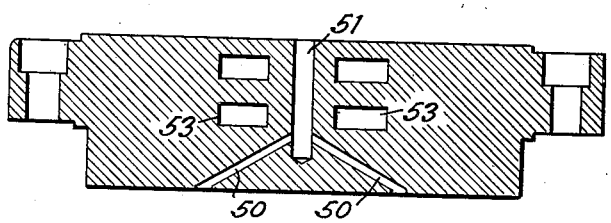
Fig. 5ᶜ.
INVENTOR
Charles M. Kendrick
BY
Bartlett Eyre Keel & Weymouth
ATTORNEYS Sept. 16, 1941.    C. M. KENDRICK    2,255,784
FLUID PRESSURE DEVICE
Filed May 24, 1940    6 Sheets—Sheet 4
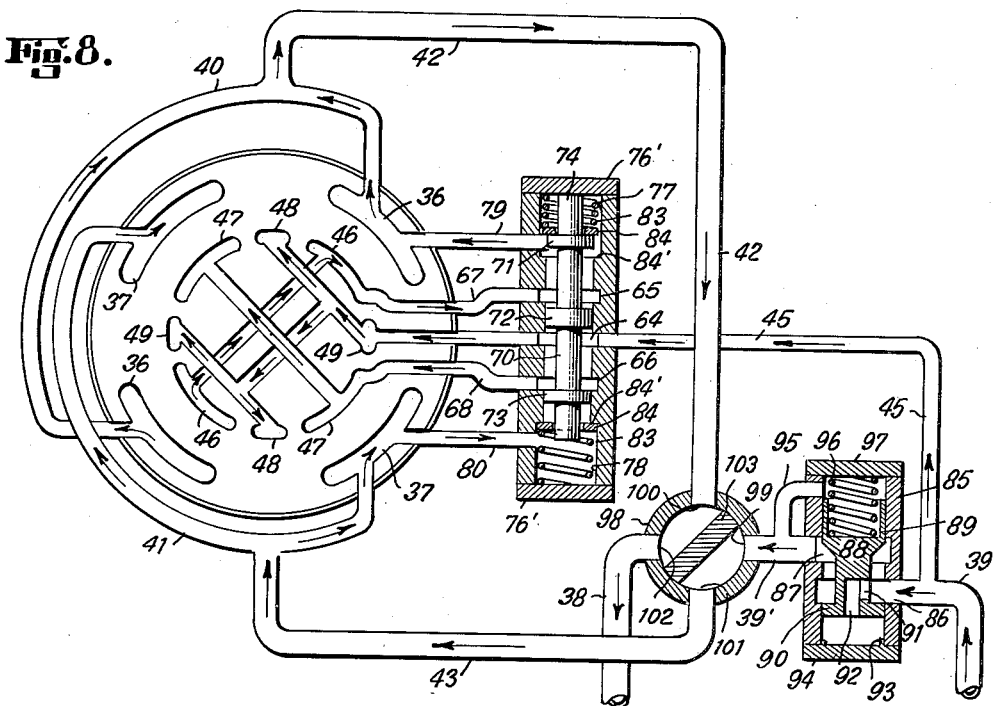
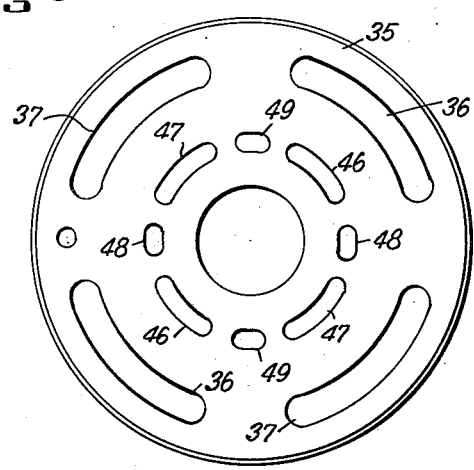
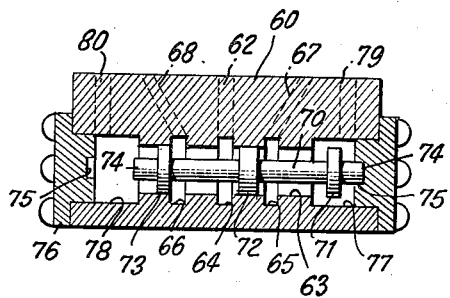
INVENTOR
Charles M. Kendrick
BY
Bartlett Eyre Keel & Weymouth
ATTORNEYS Sept. 16, 1941.   C. M. KENDRICK   2,255,784
FLUID PRESSURE DEVICE
Filed May 24, 1940   6 Sheets-Sheet 5
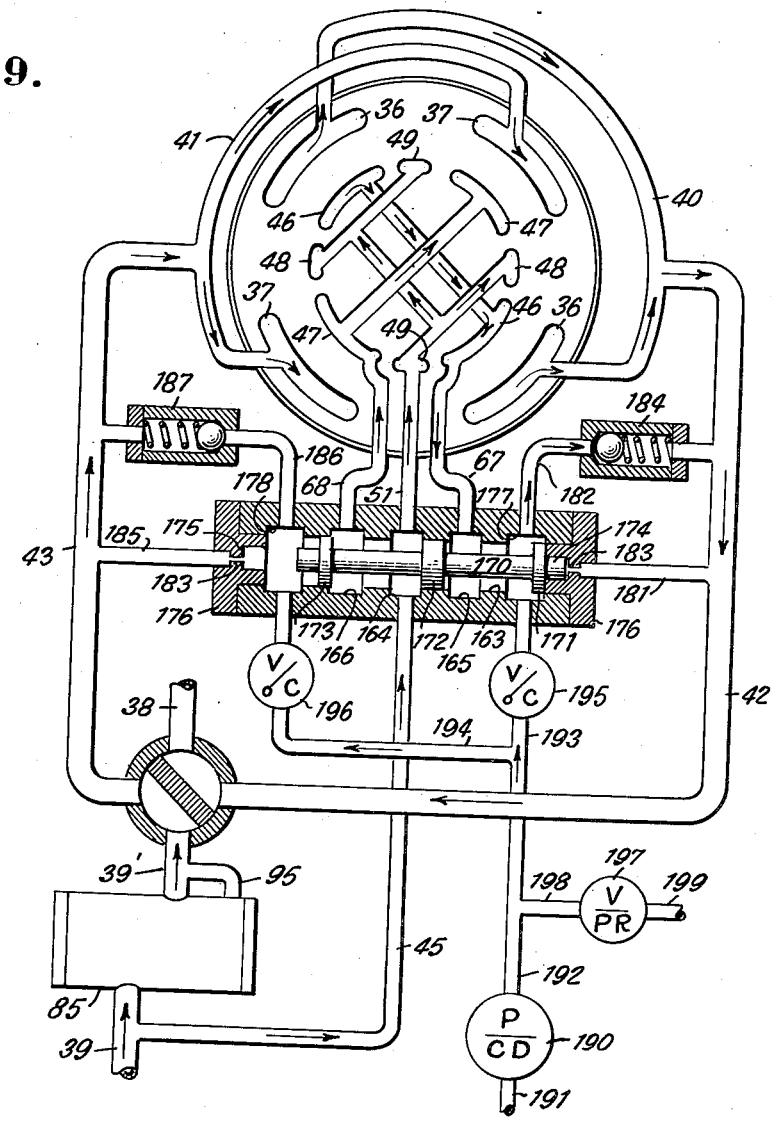
INVENTOR
Charles M. Kendrick
BY
Bartlett Eyre Keel & Weymouth
ATTORNEYS

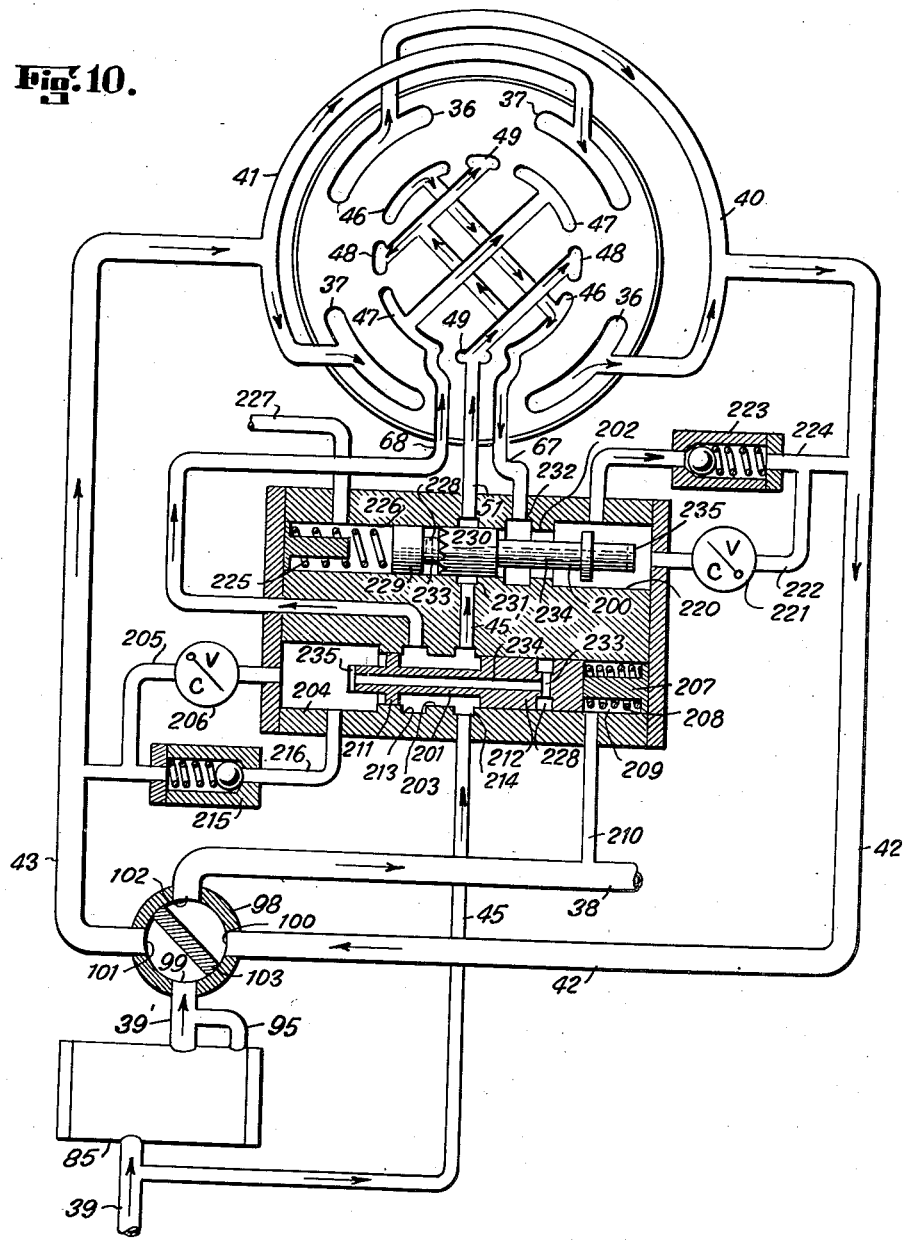

Patented Sept. 16, 1941

2,255,784

UNITED STATES PATENT OFFICE 2,255,784

FLUID PRESSURE DEVICE

Charles M. Kendrick, New York, N. Y., assignor to Manly Corporation, Washington, D. C., a corporation of Delaware Application May 24, 1940, Serial No. 336,956

23 Claims. (Cl. 121—87)

This invention relates to reversible vane type fluid pressure devices and to associated control valve mechanism and systems therefor and particularly to vane type motors and controls therefor, although certain features of the invention are applicable to pumps of the vane type.

Vane type motors of this general class include a vane track that surrounds the rotor and vane assembly and is adapted to contact the radially outer ends of the vanes and to guide and control their inward and outward motion as the rotor revolves. For quiet and satisfactory operation of the motor it is practically essential that the outer ends of the vanes be urged into contact with the vane track when operation of the motor is started and that such contact be maintained continuously during its operation. In order to provide this track-contacting and track-following action of the vanes it is necessary to supplement the action of centrifugal force with an auxiliary force acting to urge the vanes outward, at least during the portion of their rotary travel in which they are passing through the intake area or areas of the motor, so that the outer ends of the vanes will be held firmly in contact with the surrounding vane track and thus provide a movable resistance to the pressure fluid admitted to the outer ends of the vanes, whereby rotary motion is imparted to the rotor and driven shaft of the vane motor. In the vane motor of the present invention, fluid pressure means are utilized to provide this auxiliary force and this is accomplished by introducing or admitting, behind the inner ends of the vanes, pressure fluid having a pressure greater than but related to the pressure of the fluid admitted to the pressure area or areas at the outer ends of said vanes, as fully explained in my co-pending application filed March 28, 1938, Serial Number 198,449. Thus fluid under two different but related operating pressures is used; the fluid having the higher of these two pressures, which for convenience is termed the "differential high pressure fluid," is admitted to the radially inner ends of the vanes while fluid under the lesser of these two pressures (for convenience termed the "operating pressure fluid") is admitted to the pressure areas at the radially outer ends of the vanes of the vane motor. The differential high pressure fluid and the operating pressure fluid for the vane motor may be provided in any preferred manner and the means by which they are supplied forms no part per se of the present invention. For purposes of illustration, however, the embodiments illustrated in the accompanying drawings show means by which these two different but related pressures are obtained by passing the supply of fluid going to the motor through "differential pressure" or resistance valve mechanism positioned in the fluid supply conduit, as will be later more fully explained; but it is to be understood that any other suitable means may be employed for providing these two different but related pressures such, for example, as other means disclosed in co-pending application Serial Number 198,449 or in co-pending application filed May 5, 1939, Serial Number 271,874.

Co-pending application Serial Number 198,449 discloses an arrangement for a reversible vane type fluid motor in which the differential high pressure fluid is continuously supplied to the radially inner ends of all the vanes. With this arrangement the vanes are urged radially outward while passing through the intake or high pressure areas of the motor by an auxiliary force produced by the difference in pressures existing between the differential high pressure fluid and the operating pressure fluid and in practice this difference in pressures is relatively small such as 20–75 lbs. per sq. in. But while passing through the outlet areas of the motor, during which time the vanes are moving radially inward, the vanes are urged radially outward by a force produced by substantially the full or absolute pressure value of the differential high pressure fluid as the fluid in the outlet areas which acts on the exposed radially outer ends of the vanes therein is usually under little or no pressure. While this arrangement has been found to function satisfactorily as regards smoothness and quietness of operation, it nevertheless provides unneeded radially outward auxiliary force on the vanes as they pass through the outlet areas and this force, which is usually high and frequently as much as that produced by a fluid pressure of 1000 lbs. per sq. in. on the inner ends of the vanes, causes wear of the vanes and vane track, unnecessarily increases the friction between these parts and thus reduces the efficiency of the motor.

One object of the present invention is to provide an improved reversible vane type rotary motor, together with associated control valve mechanism and system therefor, of increased efficiency and free from the objections just above mentioned.

Another object is to provide an improved reversible vane type motor and associated control valve mechanism and system therefor in which the differential high pressure fluid is supplied only to the inner ends of these vanes that are passing through the inlet areas of the motor and are traversing the "working" and "sealing" arcs adjacent said inlet areas and in which the pressure of the fluid acting on the inner ends of the vanes as they pass through the outlet areas is substantially the same as the pressure of the fluid in said outlet areas so that the hydraulic forces acting radially on said vanes are substantially balanced as the vanes pass through the outlet areas.

A further object is to provide a motor of this character, together with associated control valve mechanism and system therefor, in which the foregoing operating conditions are provided, irrespective of the direction of rotation of the rotor, and in which the fluid connections necessary to provide these operating conditions are established upon change in direction of the rotor's rotation.

Another object of the invention is a novel and improved means for holding the vanes in contact with the track during any overrun of the motor upon reversal; and particularly a means by which said contact is maintained by a relatively small force.

Other objects will appear from the description which follows.

The widest present use for vane motors of this general class is as hydraulic devices, that is to say, devices for handling, or whose motive fluid is a liquid, such for example, as oil. The present invention will accordingly be described in connection with such use although it will be understood that certain features of the invention are also applicable to devices operating with elastic fluids. It will further be understood that the invention is applicable equally to vane type motors of this general class in which the displacement or fluid capacity per revolution of the rotor is constant (termed a "constant capacity motor") and to such motors in which the displacement or fluid capacity per revolution of the rotor is variable (termed a "variable capacity motor").

The invention will be understood from a consideration of the accompanying drawings which illustrate, by way of example, several embodiments of the present invention in and in connection with a constant capacity vane motor.

In the accompanying drawings:

Fig. 5 is an outer or end elevation of the cover or end head member with certain of the fluid passages therein shown in dotted lines;

Figure 1:
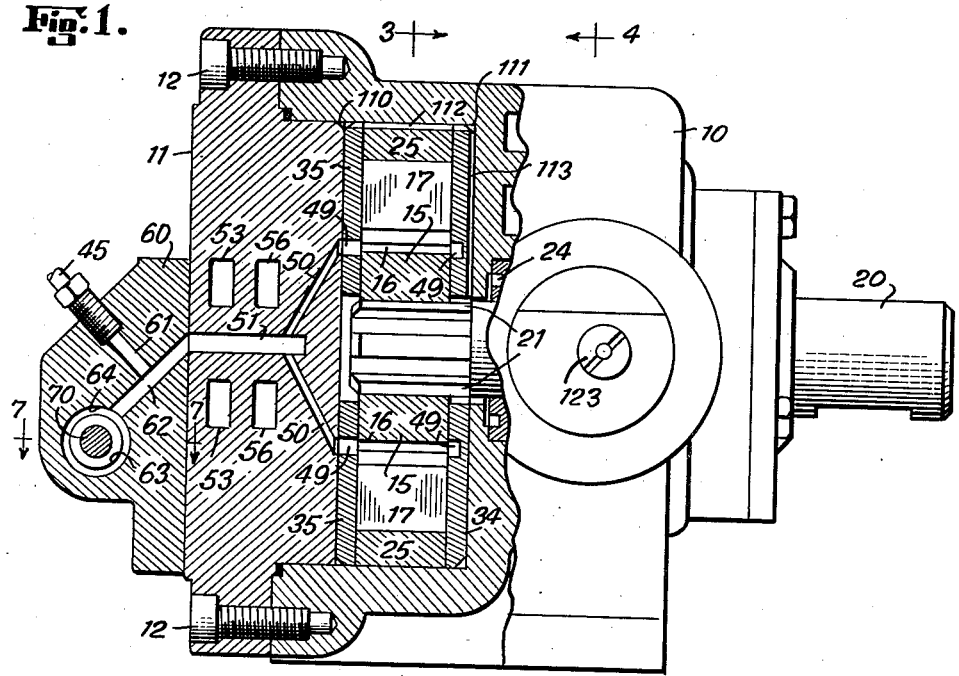
Fig. 1 is a view, partly in side elevation and partly in vertical longitudinal section, of an illustrative embodiment of a reversible vane motor constructed according to the present invention.

Figs. 5a, 5b and 5c are sectional views through the end head, showing certain of the fluid passages in section, and taken along the lines 5a—5a, 5b—5b and 5c—5c respectively of Fig. 5;

Fig. 6 shows an inner elevation of one of the members of the vane motor, for convenience termed an "end plate" or "cheek plate";

Fig. 7 is a sectional view through the control valve mechanism which controls the flow and distribution of fluid through the several passages in the end head and is taken along the line 7—7 of Fig. 1;

Fig. 8 is a diagrammatic view, partly in section, of a fluid system including the vane type motor illustrated in Figs. 1 to 7 inclusive, with certain minor modifications to be later pointed out; and Figs. 9 and 10 are also diagrammatic views, partly in section, showing modifications.

Figure 2:
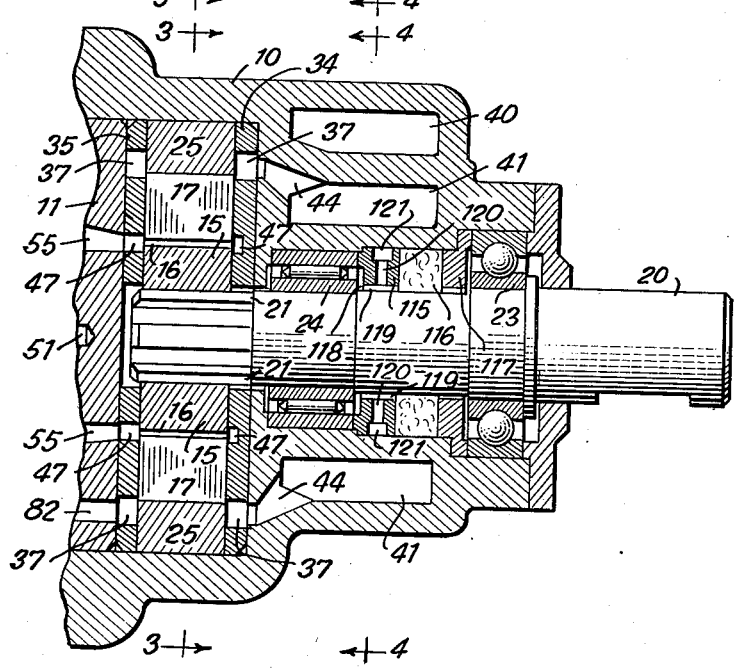
Fig. 2 is a fragmentary longitudinal sectional view taken along the lines 2—2 of Figs. 3 and 4, showing certain parts of the fluid circuit and the method of mounting the shaft.
Figure 3:
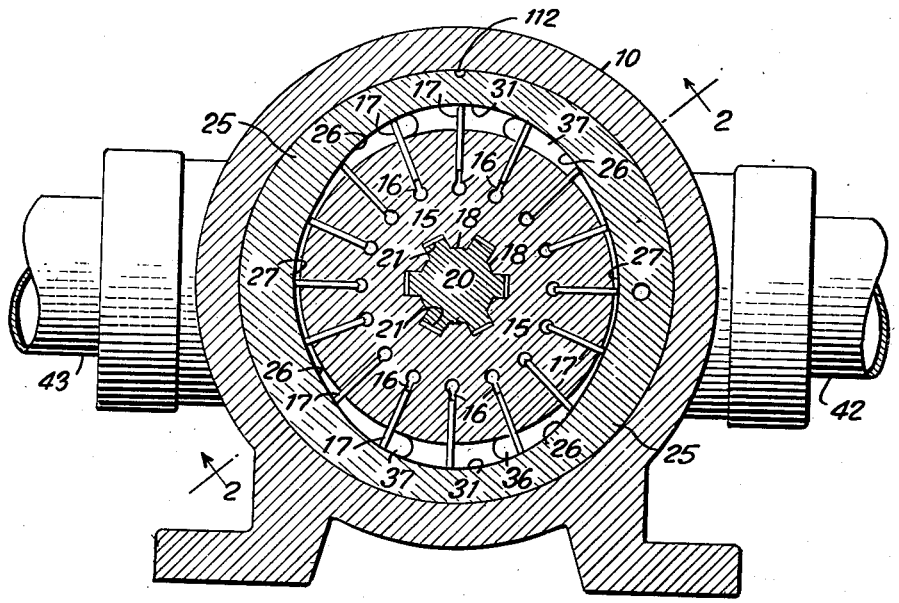
Fig. 3 is a view in vertical section transverse the axis of rotation and taken along the lines 3—3 of Figs. 1 and 2.

Referring now to Figs. 1 to 7 inclusive, the motor includes a casing 10 formed with an open-ended cavity for the rotor 15 and associated parts as shown in Figs. 1, 2 and 3. The rotor cavity is closed (Figs. 1 and 2) by an end head or cover member 11 which is attached to the casing 10 as by cap screws 12. The rotor 15 is provided with a plurality of vanes 17 which are movable in a substantially radial direction inward and outward in the vane slots 16 (Figs. 1, 2 and 3). A vane track ring 25 surrounds the rotor and vane assembly and its inner circumferential surface 26 (Fig. 3) forms a track adapted to contact the radially outer ends of the vanes 17 as the rotor revolves and to guide and control the vanes in their inward and outward movement; the surface 26 will hereinafter be referred to as the "vane track."

The rotor 15 and driven shaft 20 may be mounted and the two parts may be operatively connected with each other in any appropriate manner. In the present instance the rotor 15, shaft 20, their mountings and the operative connections therebetween are the same as disclosed in my co-pending application filed December 8, 1939, Serial Number 307,755. As shown in Fig. 2, the shaft 20 is revolubly supported by a pair of bearing elements 23 and 24 carried by the casing 10 and the rotor 15 is mounted on the end of the shaft 20 which projects into the rotor cavity. For this purpose the end of the shaft 20 is formed with axially extending splines 21 (Figs. 1, 2 and 3) and the rotor 15 is formed in its central opening with mating splines 18 (Fig. 3). The arrangement is such that the rotor 15 is freely movable in an axial direction on the shaft splines 21 while permitting a limited angular or rocking motion of the rotor 15 relative to the shaft 20 in such manner that the cheek plates 34 and 35, to be presently described, determine the axial and angular position of the rotor on the shaft and the plane of rotation of the rotor as fully explained in co-pending application Serial Number 307,755 above mentioned.

The rotor 15 is hydraulically balanced with respect to all forces imposed thereon by fluid pressure. Hydraulic balance of forces acting on the rotor in a radial direction is obtained by dividing the space intermediate the periphery of the rotor 15 and the vane track 26 into two equal and oppositely positioned fluid sections, each fluid section comprising a working chamber flanked by an inlet area and an outlet area, the inlet area and outlet area of each section being interchangeable upon reversal as will be more fully explained presently. As shown in Fig. 3, the division between the two fluid sections is effected by cooperation of the rotor 15 and the outer ends of the vanes 17 with the vane track 26 at the regions of the vane track's least diameter which in the present embodiment is adjacent the horizontal centerline. The vane track 26 is preferably provided at each of these points of division with an arc 27, for convenience termed the "sealing arc," substantially concentric with the rotor 15 and extending in a circumferential direction for a distance equal to at least the angular distance between a pair of adjacent vanes 17.

The working chambers of the two fluid sections are formed by means of two diametrically positioned arcs 31 (Fig. 3), preferably concentric with the rotor 15 and termed the "working arcs," which are located in the regions of greatest diameter of the vane track 26. Each working chamber extends in a circumferential direction for an arcuate distance substantially equal to the distance between the outer ends of two adjacent vanes 17 which at any given instant are moving in contact with the corresponding working arc 31. Operating pressure fluid is admitted between the vanes as they move through the inlet areas toward the working chambers and fluid is discharged as the vanes recede therefrom through the areas which at the time are the outlet areas of the two fluid sections. The area of each fluid section which at any time is the inlet area is thus at all times separated from the area which is then the outlet area of that fluid section by at least one of the vanes 17, and this is the case regardless of which area is the inlet area and regardless of direction of rotation of the rotor; the difference in pressures on the opposite sides or faces of such vanes causes rotation of the rotor 15. The portions of the vane track 26 intermediate the sealing arcs 27 and working arcs 31 may be given any suitable curvature producing satisfactory rates of inward and outward movemen of the vanes 17 as the rotor 15 revolves.

The sides or axial ends of the working chambers are closed by a pair of mating disc-shaped members 34 and 35 (Figs. 1, 2, 3 and 6), for convenience termed "end plates" or "cheek plates," which are provided with holes at their centers for the shaft 20. The outer surfaces of the cheek plates 34 and 35 fit snugly against the wall surfaces of the casing 10 and end head 11 respectively and form substantially fluid tight fits with the several ports and passages to be presently described. The inner or opposing faces of the cheek plates 34 and 35 form fluid tight fits with the sides of the vane track ring 25 by which they are axially positioned with respect to the rotor 15 in such manner that the rotor is permitted to turn freely while its sides and the sides of the vanes 17 form substantially fluid tight running fits with the adjacent faces of the cheek plates 34 and 35. The cheek plate 34 will hereinafter be termed the "casing cheek plate" and the cheek plate 35 wil be termed the "end head cheek plate."

The cheek plates 34 and 35 are provided with co-extensive mating ports (Figs. 2, 3 and 6), the ports of one cheek plate being axially opposite the ports of the other cheek plate when the parts are in position in the casing 10 so that all forces exerted upon the rotor 15 and vanes 17 in an axial direction by fluid pressure are thus completely balanced. The ports in the cheek plates 34 and 35 will be best understood from Fig. 6 which shows an inner elevation or the rotor face of the end head cheek plate 35. Referring to Fig. 6, each cheek plate is provided with a pair of diametrically opposed arcuate slots or ports 36 and a similar pair of diametrically opposed slots or ports 37; either pair of these ports may be the inlet ports and the other pair will then be the outlet ports, depending upon the direction of flow of fluid in the circuit. The ports 36 and 37 of the casing cheek plate 34 are also partially shown in Fig. 3 and the ports 37 are also shown in the sectional view of Fig. 2. Operating pressure fluid is admitted to the outer ends of the vanes through either the pair of ports 36 or the pair of ports 37, depending upon the direction of the flow of fluid in the circuit, in the casing cheek plate 34, and similarly, fluid discharged or exhausted by the outer ends of said vanes passes out through the other pair of ports of the same cheek plate. The ports 36 and 37 of the end head cheek plate 35 function principally as "balance ports" to contain fluid under the same pressure as that in the corresponding ports of the casing cheek plate 34 in order to produce hydraulic balance of the rotating parts, as already stated.

The portion of the fluid circuit for conveying fluid to and from the outer ends of the vanes 17 also includes a pair of branched channels 40 and 41 respectively (Figs. 2 and 4) which are formed in the casing and which are similar to the fluid channels shown in application Serial Number 307,755. The fluid channel 41 is connected with the fluid conduit 43 and with the ports 37 of the casing cheek plate 34 by slanted passages 44 (Fig. 2). The fluid channel 40 is similarly connected with the fluid conduit 42 and is also connected with the two ports 36 of the casing cheek plate 34 as by slanted passages not shown for convenience but similar to the slanted passage 44 shown in Fig. 2.

With the arrangement hereinbefore described, operating pressure fluid admitted to the conduit 42 will pass into the ports 36 of the casing cheek plate 34 and the fluid areas connected with said ports 36 will then be the intake areas; operating pressure fluid acting on the adjacent faces of the vanes 17 that are then in contact with the working arcs 31 will cause rotation of the rotor 15 and shaft 20 in a clockwise direction as viewed in Fig. 3; the fluid areas connected with the ports 37 of the casing cheek plate 34 will then be the outlet or discharge areas and the fluid discharged by the outer ends of the vanes will pass out through the ports 37 of said cheek plate 34, through the connecting passages 44 and channel 41 and out through the conduit 43. Similarly, operating pressure fluid admitted to the conduit 43 will pass to the ports 37 of the casing cheek plate 34, causing rotation of the rotor 15 and shaft 20 in a counter-clockwise direction as viewed in Fig. 3, and fluid exhausted by the outer ends of the vanes 17 will pass out through the ports 36 of the casing cheek plate 34, through the slanted passages 44, the channel 40 and finally out through the conduit 42.

Satisfactory operation of the motor requires that the radially inner ends of the vanes 17 be supplied with differential high pressure fluid while the radially outer ends thereof are passing through whichever area of each fluid section is at the time its intake area. For increased efficiency of the motor and reduced wear of the vanes and vane track it is also necessary that the pressure of the fluid on the radially inner ends of the vanes be the same as or only slightly greater than the pressure on the radially outer ends thereof during the time that said outer ends are passing through whichever area of each fluid section is at the time its outlet or discharge area. The means by which these operating conditions are provided, irrespective of direction of rotation of the rotor 15, and by which they are changed to correspond to change in location of the intake and outlet areas upon reversal of direction of rotation of the rotor 15 are important features of the present invention and will now be described and explained.

Referring now to Fig. 6, each of the cheek plates 34 and 35 is provided with four pairs of mating arcuate ports 46, 47, 48 and 49 respectively in the faces thereof adjacent the rotor 15. These ports (for convenience hereinafter termed the "vane slot ports") are positioned to register successively with the inner ends of the vane slots 16 as the rotor revolves and the vane slot ports of each pair are positioned diametrically opposite each other. All fluid passing to and from the inner ends of the vanes and vane slots passes through the vane slot ports of the end head cheek plate 35 and hence all of the vane slot ports in said cheek plate 35 extend through its entire thickness; the vane slot ports of the casing cheek plate 34 serve principally as "balance ports" receiving their supply of fluid through the vane slots 16 and hence they are merely recessed in the rotor face of that cheek plate as shown in Figs. 1 and 2.

Each of the pair of vane slot ports 46 is adapted to connect with the inner end of each vane slot 16 during the time that the outer end of the vane therein is passing through the fluid area connected with the corresponding radially outward port 36; and similarly, each of the pair of vane slot ports 47 is adapted to connect with the inner end of each vane slot 16 during the time that the outer end of the vane therein is passing through the fluid area connected with the corresponding radially outward port 37. In the same manner, each of the pair of vane slot ports 48 and each of the pair of vane slot ports 49 is adapted to connect with the inner end of each vane slot during the time that the outer end of the vane therein is traversing the corresponding sealing arc 27 or working arc 31.

The end head 11 is provided with appropriate fluid passages for conveying fluid to and from each pair of the vane slot ports 46, 47, 48 and 49 of the end head cheek plate 35, as shown in Figs. 1, 5, 5a, 5b, and 5c. The two pairs of vane slot ports 48 and 49 are at all times supplied with differential high pressure fluid, irrespective of the direction of flow of fluid to the outer ends of the vanes and irrespective of the direction of rotation of the rotor; each of said vane slot ports 48 and 49 in the end head cheek plate 35 accordingly registers with one end of its corresponding slanted radial passage 50. The four passages 50 converge toward and connect with an axial hole or passage 51 which extends to the outer face of the end head 11 (Fig. 5c). The arrangement may be observed from the dotted lines of Fig. 5 and also from the sectional view of Fig. 5c which shows the two passages 50 leading to the pair of vane slot ports 48 and in the sectional view of Fig. 1 which shows the two passages 50 that connect with the vane slot ports 49.

Each of the pair of vane slot ports 46 of the end head cheek plate 35 registers with an arcuate port 52 (Figs. 5 and 5b) formed in the adjacent or inner wall or face of the end head 11 and said ports 52 in turn connect with a cored passage 53 formed in said end head 11. The cored passage 53 connects with one end of an axial hole or passage 54 leading to the outer face of the end head 11. In a similar manner, each of the pair of vane slot ports 47 of the end head cheek plate 35 registers with an arcuate port 55 (Figs. 5 and 5a) in the adjacent or inner wall of the end head 11 and said ports 55 in turn connect with a cored passage 56 connecting with the inner end of an axial hole or passage 57 which leads to the outer face of the end head 11. The general shape and arrangement of the two cored passages 53 and 56 may be observed in the dotted lines of Fig. 5 and from the sectional views of Figs. 5a, 5b and 5c, in which it will be noted that said passages 53 and 56 are positioned in different planes in the end head 11 and that each of them surrounds a solid portion adjacent the vertical and horizontal center-lines of the end head, in which solid portion the axial hole or passage 51 is drilled.

With the above described arrangement it will be seen that all fluid going to or from the inner ends of the vanes 17 passes through the holes or passages 51, 54 and 57 that lead through to the outer face of the end head 11. The flow of fluid through these holes or passages is regulated by valve mechanism which will now be described.

The valve mechanism employed to control the flow of fluid to and from the inner ends of the vanes 17 through the vane slot ports 46, 47, 48 and 49 of the cheek plate 35 is shown in the sectional view of Fig. 7 and is contained in a housing 60. The housing 60 is attached to the outer face of the end head 11 as shown in Fig. 1 by cap screws or he like, not shown, in such manner that there is a fluid tight joint at the point of connection of each of the several passages therein that connect with passages in said end head 11. Differential high pressure fluid, obtained from any preferred source in any preferred manner, is admitted to the housing 60 through a conduit 45 which connects with a slanted passage 61 leading to an oppositely slanted passage 62 as shown in Fig. 1. The slanted passage 62 extends to the face of the housing 60 adjacent the end head 11 where it connects with the axial hole or passage 51, so that differential high pressure fluid is at all times supplied to the two pairs of vane slot ports 48 and 49.

The other end of the passage 62 leads to and connects with an annular port 64 in the valve bore 63 (Figs. 1 and 7) positioned intermediate the annular ports 65 and 66. The annular port 65 connects with a passage 67, as shown by the dotted lines of Fig. 7, which leads to the face of the housing 60 adjacent the end head 11 and the outer end of said passage 67 is adapted to connect with the axial passage 54 in said end head 11. The annular port 66 is similarly connected with a passage 68 (dotted lines in Fig. 7) leading to and connecting with the axial passage 57 in the end head 11. The actual points of connection of the passage 67 with the passage 54 and of the passage 68 with the passage 57 are not shown but will be understood from the description and from the parts as illustrated in the drawings.

Slidably fitted within the valve bore 63 is a valve piston 70 (Figs. 1 and 7) formed with three spaced heads 71, 72 and 73 respectively. Movement of the valve piston in the valve bore is limited by reduced end portions 74 extending from the heads 71 and 73, each of which reduced portions 74 is adapted to enter the recess 75 in its corresponding end cover 76 that closes that end of said valve bore, the recesses 75 serving as dashpots to prevent sudden and violent striking of the end of the valve piston against the end covers.

The enlarged end portions 77 and 78 (Fig. 7)

of the valve bore are connected with the ports 36 and 37 respectively in the end head cheek plate 35. For this purpose the end portions 77 and 78 connect with the inner ends of a pair of passages 79 and 80 (dotted lines of Fig. 7) which are adapted to connect with a corresponding pair of axial passages 81 and 82 extending through the end head 11 (Figs. 5, 5a and 5b) and leading to one of the ports 36 and one of the ports 37 respectively in the end head cheek plate 35; the passage 82 is also shown in the sectional view of Fig. 1. The opposite ends of the valve bore are thus at all times supplied with fluid under the same pressures as existing in the ports 36 and 37 respectively and the difference in these pressures acts on the valve piston 70 and determines its location in one or the other of its extreme positions in the valve bore; this difference in pressures also acts to move the valve piston 70 from one extreme position to the other responsively to change in direction of fluid flow in the conduits and passages leading to the outer ends of the vanes, this change being incident to reversal of the rotor. In other words, the valve piston 70 occupies its extreme position toward the right in which it is shown in Fig. 7 when the ports 37 are the intake or high pressure ports, the ports 36 then being the outlet or low pressure ports, but said valve piston 70 is shifted instantly to its extreme position toward the left upon reversal and when the ports 36 become the intake or high pressure ports.

The heads 71, 72 and 73 of the valve piston 70 are so positioned and arranged that they establish proper fluid connections with the vane slot ports 46 nad 47 to provide the desired operating conditions, as hereinbefore set forth, when said valve piston 70 is in one or the other of its extreme positions, these connections corresponding with the requirements of the vanes for proper operation. For example, as already stated the valve piston 70 is moved to and occupies its extreme position toward the right when the ports 37 are the intake or high pressure ports. In this extreme position, the reduced portion of the valve piston 70 intermediate the heads 72 and 73 establishes fluid connection between the ports 66 and 64 and at the same time said heads 72 and 73 cut off fluid communication between these ports and all other portions of the valve bore. Differential high pressure fluid then passes from the port 64 into the port 66, through the intervening passages and into the vane slot ports 47 so that the vanes 17 are urged into contact with the vane track during the time they are passing through the fluid area of each fluid section that is connected with its port 37. At the same time the head 71 has moved into the enlarged end portion 77 of the valve bore and fluid is then free to pass out from the vane slot ports 46, through the intervening passages and the port 65, into the valve bore 63 and out of the enlarged end portion 77 of said valve bore through the passages 79 and 81 and finally into the connected port 36 in the end head cheek plate 35. Fluid discharged by the inner ends of the vanes 17 through the vane slot ports 46 thus joins with the fluid being discharged by the outer ends of the vanes 17 and passes away through the fluid channel 40 and conduit 42. As already stated, the ports 36 are the outlet ports when the valve piston 70 is in its extreme position toward the right, and it will thus be seen that the fluid pressure in the vane slot ports 46 is substantially the same as that in the ports 36 so that there is substantially no fluid imposed force active to urge the vanes into contact with the vane track during this portion of their rotary travel, in which said vanes are moving radially inward; friction and wear are thus reduced and efficiency increased.

Upon reversal of direction of fluid flow in the fluid passing to the outer ends of the vanes, the ports 36 will become the intake or high pressure ports, the ports 37 will become the low pressure or outlet ports and the direction of rotation of the rotor will be reversed. Instantly upon such reversal of fluid flow, the valve piston 70 will be moved to its extreme position toward the left and the above-described connections of the vane slot ports 46 and 47 will be reversed. Thus, the port 65 will be connected with the port 64 and differential high pressure fluid will be supplied to the vane slot ports 46. Fluid discharged by the inner ends of the vanes through the vane slot ports 47 will then pass through the intervening connections and the port 66, into the left hand end 78 of the valve bore 63, through the passages 80 and 82 and into the connected port 37 of the end head cheek plate 35.

It is thus seen that, by the arrangement here provided, differential high pressure fluid is at all times supplied to the inner ends of the vanes during the time that the outer ends thereof are traversing the working arcs 31 and sealing arcs 27. It will further be seen that differential high pressure fluid is also supplied to the inner ends of the vanes during the time they are passing through whichever area of each fluid section is at the time its intake or high pressure area and that the inner ends of the vanes are connected with the exhaust while the outer ends thereof are passing through the other areas which are then the outlet areas. It will also be seen that these connections are provided regardless of the direction of rotation of the rotor 15 and are instantly changed upon reversal. It will also be observed that these changes take place responsive to relative pressures existing in the ports 36 and 37 and that the passages 79, 80, 81 and 82 connecting said ports 36 and 37 with the ends of the valve bore serve the double purpose of supplying pressure fluid to act on the valve piston to control its position and movement and also provide a path of flow for fluid discharged by the inner ends of the vanes 17.

The fluid circuit described and explained in connection with Figs. 1 to 7 inclusive is schematically shown in Fig. 8 which also shows a differential pressure or resistance valve in the supply line for providing the differential high pressure fluid and a reversing valve for reversing the direction of fluid flow to and from the motor in order to reverse the direction of rotation of the rotor 15. The same reference numerals have been used to designate the portions of the fluid circuit shown in Fig. 8 that correspond to like numbered portions of the circuit described in connection with Figs. 1–7. In Fig. 8 the valve mechanism for controlling the flow of fluid to and from the inner ends of the vanes 17 is the same as that shown in Figs. 1 and 7 except for minor modifications such, for example, as the connections by which the supply of differential high pressure fluid for the vane slot ports 48 and 49 passes through the annular port or counterbore 64 of valve bore 63 in the arrangement of Fig. 8 instead of passing directly from the conduit 45 as in Fig. 1. It will also be noted that the recesses or dash-pots have been omitted in the modified end covers 76' and that each of the enlarged end ports 77 and 78 of the valve bore has been provided with a spring 83 and a washer 84 which engages the adjacent head 71 or 73 respectively of the valve piston 70 when said valve piston is displaced from its middle position toward the corresponding end of the valve bore. The inner ends 84' of the enlarged valve bore portions 77 and 78 serve as shoulders or stops that limit the inward movement of the washers 84 and hence limit the distance through which the spring 83 in each end can exert a force upon the valve piston 70; with this arrangement, force is exerted upon the valve piston only by the spring in the end of the valve bore toward which it is displaced and the valve piston is returned to its center or middle position by the springs 83 whenever the same pressure exists in the ports 36 and 37.

In the fluid circuit illustrated in Fig. 8, pressure fluid for operation of the motor is delivered into the supply line 39 from any suitable source, not shown, such, for example, as a pump, and a differential pressure valve is positioned in said supply line intermediate said source and the reversing valve 98. The differential pressure valve shown in Fig. 8 is similar in principle to the corresponding mechanism disclosed in copending application Serial Number 198,449 but differs therefrom in certain features of its construction. It includes a housing 85 having a valve bore suitably closed at both its ends and provided with an annular inlet port 86 and an annular discharge port 87 axially spaced from the inlet port 86. The inlet port 86 is connected with the supply line 39 and the discharge port 87 is connected with the portion 39' of the supply line leading to the reversing valve 98.

Slidably fitted within the valve bore is a valve piston 88 having two heads 89 and 90 respectively of the same cross-sectional area and spaced from each other so that the inlet port 86 is always in communication with the reduced portion of said valve piston 88 that separates the two heads 89 and 90. The end of the valve piston 88 adjacent the head 90 is adapted to be acted upon at all times by fluid having the same pressure as that in the inlet port 86 and is accordingly connected with said port by a radial hole 91 that connects with an axial hole 92 extending through the head 90. A small shoulder 93 on the end cover 94 acts as a stop for the valve piston and thus exposes substantially the full area of the end of the valve piston 88 to the action of the pressure fluid when said piston is in its fully closed position. The end of the valve piston 88 adjacent the head 89 is similarly adapted to be acted upon by fluid having the same pressure as that in the discharge port 87 and the corresponding end of the valve bore is accordingly connected with the portion 39' of the supply line as by a passage 95 that enters the valve bore at a point that is not covered or closed when the valve piston 88 is in its extreme open position. The valve piston 88 is thus urged toward its fully open position by action of pressure fluid from the inlet port 86 on the end of said valve piston adjacent the head 90 and this force is opposed by the action of pressure fluid from the discharge port 87 upon the opposite end of said valve piston 88 and the supplementary force exerted by a spring 96, one end of which bears against the valve piston 88 and the other end of which bears against the cover 97 that closes that end of the valve bore.

Two oppositely acting forces are thus brought to bear on the valve piston 88 and said piston is moved until these opposing forces are balanced. This balance of forces is effected by movement of the valve piston 88 until the head 89 partially closes the discharge port 87, thereby increasing the resistance to flow therethrough and producing a pressure in the inlet port 86 that exceeds the pressure existing in the discharge port 87, so that the force exerted by the action of pressure fluid from the inlet port 86 upon the end of the valve piston adjacent the head 90 equals the combined forces exerted by the action of pressure fluid from the discharge port 87 on the opposite end of the valve piston and the supplementary force exerted thereon by the spring 96. The valve piston 88 is thus moved to maintain the fluid in the inlet port 86 at a pressure exceeding the pressure existing in the discharge port 87 by an amount corresponding to the force exerted by the spring 96 at all times when fluid passes through the discharge port 87. The spring 96 moves the valve piston 88 to its fully closed position (in which no fluid can pass from the inlet port 86 to the discharge port 87) whenever the pressure difference is insufficient to overcome the force exerted by said spring 96, as when the motor is not being operated and no pressure exists in the supply line 39; the valve piston 88 remains in its closed position until sufficient pressure is built up to overcome the force exerted by the spring, so that no pressure fluid can pass to the reversing valve 98 etc. and to the outer ends of the vanes until the differential high pressure has been established, thus assuring smooth starting of the motor. The pressure in the inlet port 86 thus exceeds the pressure in the discharge port 87 whenever the motor is in operation, the difference in pressures being a substantially constant amount determined by the spring 96 and maintained irrespective of absolute pressures. Differential high pressure fluid for the inner ends of the vanes is thus provided. The conduit 45 is accordingly connected with the supply line 39 at a point ahead of the differential pressure valve and fluid passing through said conduit will thus always exceed in pressure the fluid passing to the outer ends of the vanes through the reversing valve 98, etc.

The reversing valve 98 schematically shown in Fig. 8 is provided with a bore having four ports 99, 100, 101 and 102 respectively and also having a rotatable body 103. The port 99 is connected with the portion 39' of the supply line and the port 102 is connected with the exhaust conduit 38 leading to the reservoir, not shown. The ports 100 and 101 are connected with the conduits 42 and 43 respectively. With the body 103 in the position shown in Fig. 8, the supply line 39' is connected with the conduit 43 and the conduit 42 is connected with the exhaust conduit 38; operating pressure fluid then passes to the ports 37 and the rotor revolves in a counter-clockwise direction as viewed in Fig. 3 as already stated; fluid is exhausted through the ports 36 and passes out through the conduit 42. Rotation of the body 103 through 90° connects the supply line 39' with the conduit 42 and operating pressure fluid passes to the ports 36, causing the rotor to revolve in a clockwise direction; fluid is then exhausted through the ports 37 and passes out through the conduit 43 which is then connected with the exhaust conduit 38. Upon such reversal of flow, the valve piston 70 is moved to provide proper fluid connections for the inner ends of the vanes, as already explained.

The method of and arrangement for supplying fluid to and discharging fluid from the inner ends of the vanes as shown in Figs. 1 to 8 inclusive, and explained in connection therewith, has been found to work with entire satisfaction under ordinary conditions of reversal in which the rotor 15 is substantially instantly stopped upon change of direction of fluid flow or in which said rotor 15 ceases to rotate in the interval between the time that the supply of operating pressure fluid is cut off from one of the pairs of ports 36 or 37 and before the operating pressure fluid is admitted to the other pair of these ports. This interval may be extremely small and reversal may be made almost instantaneously when the inertia load on the motor shaft 20 is small or such that rotation of the rotor 15 and its connected load may be substantially instantly stopped by opposing action of the pressure fluid (within the limits of the maximum pressure to be employed in the system) on the outer ends of the vanes upon reversal of fluid flow.

Large inertia loads require either an extremely high pressure to instantly stop their rotation, however, or a relatively longer time for deceleration. In most instances it is not practical to instantly stop the rotation of large inertia loads when rotating at high speeds because of the excessively high pressure required to effect such stoppage and it is customary to decelerate the load as rapidly as can be accomplished within certain reasonable pressure limits and during such deceleration the rotor tends to "over-run" and act as the rotor of a pump. The mechanism for supplying fluid to and discharging fluid from the inner ends of the vanes, as shown in Figs. 1 to 8, does not operate to provide quiet and satisfactory operation with certainty during such over-run, that is, with high inertia loads upon rapid reversal. The reason for this is that the motor tends to act as a pump during this period of deceleration, as already stated, and since the valve piston 70 moves instantly upon reversal of relative pressures in the ports 36 and 37, no auxiliary force is available during "over-run" of the rotor to urge the vanes 17 into contact with the vane track as they move outward through what are then the low pressure (intake) areas and during the time that the speed of the rotor is constantly decreasing with corresponding decrease in the centrifugal force available to move the vanes outward. The result is objectionable noise, comparable to that encountered in any vane pump if the vanes do not move out properly during intake and in which the vanes are working against a substantial pressure such, for example, as 1000 lbs. per sq. in. Figs. 9 and 10 illustrate modifications capable of quiet and satisfactory operation under all operating conditions, including very rapid reversal under large inertia load. The arrangement of Figs. 1 to 8 will be preferable where suited because of its greater simplicity and lower cost. The arrangements of Figs. 9 and 10 are similar to that of Fig. 8 except as relates to the mechanism having to do with the fluid supplied to the inner ends of the vanes and the fluid discharged thereby; all corresponding parts of Figs. 9 and 10 have been designated with the same reference numerals used to designate them in Fig. 8 and will not be again described.

The valve piston 170 of Fig. 9 is provided with three heads 171, 172 and 173 respectively and is generally similar to the valve piston 70 of Fig. 7; the valve bore 163 is likewise similar to the valve bore 63 although the ports 164, 165 and 166 have been enlarged to facilitate manufacture and to reduce the resistance to fluid flow therethrough. It will also be observed that the port 164 is wider than the head 172 of the valve piston and hence is not closed by said head 172 when the valve piston 170 is in and near its middle position so that the ports 165 and 166 are both connected with the port 164 and receive differential high pressure fluid when said valve piston is in and near said middle position. The pair of vane slot ports 46 is connected with the port 165 and the pair of vane slot ports 47 is similarly connected with the port 166 in a manner similar to that shown in Fig. 8.

The enlarged end portion 177 of the valve bore is provided with two fluid connections 181 and 182 respectively, here for convenience in illustration shown as connected with the conduit 42 although they could be connected with port 36. The passage 181 connects with the adjacent end cover 176 and is preferably restricted, as at 183, at its point of connection with the dash-pot recess 175. The passage 182 is provided intermediate its ends with a one-way spring-loaded check valve 184 adapted to open to permit the passage of fluid from the enlarged end portion 177 of the valve bore to the conduit 42 but which closes to prevent the passage of fluid in the opposite direction. The valve bore's enlarged end portion 178 is similarly provided with two connections 185 and 186 respectively leading to and connecting with the conduit 43, the passage 186 being provided with a one-way spring-loaded check valve 187.

The arrangement of Fig. 9 also includes an auxiliary pump 190, here shown as a constant capacity pump, which takes its supply of fluid from a suitable reservoir, not shown, through an inlet passage 191 and discharges its pressure fluid into the discharge passage 192. The discharge passage 192 has two branches 193 and 194 respectively leading to the valve bore's enlarged end portions 177 and 178 respectively. The branch passages 193 and 194 are provided intermediate their ends with one-way check valves 195 and 196 respectively, each of which is adapted to open to permit the flow of fluid into its corresponding end of the valve bore whenever the pressure in said branch passages 193 and 194 exceeds the opposing pressure in the corresponding end of said valve bore but which prevent the flow of fluid in the opposite direction. The pressure existing in the discharge passage 192 and its branches 193 and 194 is regulated and held substantially constant by a pressure relief valve 197 connected with the passage 192 as by a passage 198 and having an exhaust passage 199 leading back to the reservoir, not shown.

As in the embodiment of Fig. 8, the valve piston 170 is moved and its position determined by relative pressures existing in the conduits 42 and 43 respectively, and said valve piston is instantly moved to its extreme corresponding position upon change in said relative pressures. Fig. 9 shows the valve piston 170 in its extreme position toward the right under influence of operating pressure in the conduit 43 and exhaust pressure (always low and usually negligible) in the conduit 42. In this position of the valve piston 170 the port 166 is connected with the port 164 and differential high pressure fluid is supplied to the pair of vane slot ports 47, as in the embodiment of Fig. 8. The check valves 187 and 196 are closed and there is no flow of fluid through the valve bore's enlarged end portion 178 which merely contains fluid under the same pressure as that in the conduit 43. Both pairs of the vane slot ports 48 and 49 are continuously connected with the differential high pressure fluid supply, as in the embodiment of Fig. 8.

In and near the valve piston's extreme position toward the right its end portion 174 adjacent the head 171 closes the dash-pot recess 175 in the adjacent end cover 176, thus cutting off communication between the valve bore's enlarged end portion 177 and the conduit 42 through the passage 181; but it will be observed that the pressure of the fluid in the conduit 42 is at all times active on the adjacent end of the valve piston's reduced portion 174 and will thus immediately shift the valve piston toward the left if operating pressure fluid is admitted to the conduit 42 and the conduit 43 is connected with the exhaust.

Further features of the arrangement and its operation will be best understood by assuming that the direction of fluid flow in the conduits 42 and 43 has just been reversed, that operating pressure fluid has just been admitted to the conduit 43 and that the valve piston 170 has just moved to its extreme position toward the right in which it is shown. If the rotor "over-runs" under high inertia load or for any other cause and continues to rotate in a clockwise direction (in which direction it has been rotating prior to reversal) the vanes 17 must continue to move radially outward, in order to maintain their contact with the vane track, during the time that the outer ends of said vanes are moving through the fluid areas connected with the ports 36 and while the inner ends thereof are connected with the vane slot ports 46; as the speed of the rotor decreases it becomes increasingly necessary that the correspondingly decreasing centrifugal force be supplemented with an auxiliary force in order to provide during this part of their rotary travel the track-following action of the vanes that is necessary for quiet and satisfactory operation. This auxiliary force is supplied by fluid from the auxiliary pump 190 which has a pressure greater than that of the fluid in the conduit 42 and which passes through the check valve 195, into the valve bore's enlarged end portion 177, through the port 165 and into the pair of vane slot ports 46 where it acts to move the vanes 17 radially outward and hold them in contact with the vane track. Quiet and satisfactory operation is thus obtained. The spring of the check valve 184 is preferably made such that this check valve will not open at the pressure required to move the vanes 17 into contact with the vane track; in other words, the pressure required to open the check valve 184 is preferably slightly higher than the pressure maintained by the relief valve 197 so that no fluid from the auxiliary pump 190 passes through said check valve 184. The above described action continues so long as the rotor continues to "over-run." When the rotor ceases to "over-run" and begins to rotate in a counter-clockwise direction under influence of operating pressure fluid in the ports 37, the vanes 17 will move inward during the time that the inner ends of their corresponding vane slots 16 are connected with the pair of vane slot ports 46, and hence said vanes will discharge fluid into said vane slot ports 46. This discharged fluid passes into the valve bore's enlarged end portion 177 where it build up a pressure that first acts to close the check valve 195 and then to open the check valve 184 to permit fluid to be exhausted into the conduit 42. Fluid discharged by the inner ends of the vanes is thus discharged against a pressure determined by the check valve 184 but this need be only a relatively small amount of pressure that slightly exceeds the pressure maintained by the relief valve 197; for example, the relief valve 197 may be set to maintain a pressure of 20-25 lbs. per sq. in. and the check valve 184 may be made to open at 30-40 lbs. per sq. in. These small pressures cause no material wear or friction and do not greatly affect efficiency.

The valve piston 170 will be instantly moved to its extreme position toward the left if the flow of fluid in the conduits 42 and 43 is reversed and operating pressure fluid is admitted to the conduit 42. The above described connections will then be reversed. Differential high pressure fluid will be supplied to the pair of vane slot ports 46 and fluid will be admitted to and discharged from the pair of vane slot ports 47 in the same manner as above described and as will be understood from the foregoing explanation.

The arrangement of Fig. 9 thus provides proper vane action of all the vanes at all times and under all operating conditions and smooth, quiet and efficient operation is obtained. It will be noted, in this connection, that differential high pressure fluid is momentarily admitted to all of the vane slot ports 46, 47, 48 and 49 as the valve piston 170 travels near and through its middle position so that quiet operation is assured during even this very small time interval.

The modification illustrated in Fig. 10, in one aspect, may be said to provide substantially the same type of operation provided by the arrangement of Fig. 9 but does not require the use of an auxiliary pump. As in the embodiments of Figs. 1-8 and Fig. 9, differential high pressure fluid is continuously supplied to the two pairs of vane slot ports 48 and 49, for example, in the same manner as explained in connection with Figs. 1-8. The arrangement of Fig. 10 includes a valve piston 200 slidably fitted in a valve bore 202 for controlling the flow of fluid to and from the pair of vane slot ports 46 and a similar separate but oppositely positioned valve piston 201 shown as slidably fitted in a separate valve bore 203 for controlling the flow of fluid to and from the pair of vane slots 47. The arrangement will be further understood from the following description of its operation.

Fig. 10 shows the conduit 43, and hence a pair of ports 37, connected with the source of operating pressure fluid. The enlarged end portion 204 of the valve bore 203 is filled with fluid under the same pressure as that in the conduit 43, this fluid entering through the passage 205 and one-way check valve 206 which opens to permit fluid from said conduit 43 to enter said end portion 204 but closes to prevent flow of fluid in the opposite direction. The force exerted by the operating pressure fluid against the adjacent end of the valve piston 201 moves said valve piston to its extreme position toward the right as determined by a suitable stop 207, this movement being opposed only by the relatively light spring 208 in the valve bore's end 209 which is at all times connected with the atmosphere or the reservoir as by a passage 210 here shown as connecting with the exhaust conduit 38. In this extreme position of the valve piston 201, the reduced portion thereof intermediate its heads 211 and 212 connects the ports 213 and 214 in the valve bore 203. The port 213 is connected with the pair of vane slot ports 47 and the port 214 is at all times connected with the source of the differential high pressure fluid, as by the conduit 45, so that differential high pressure fluid is thus supplied to said vane slot ports 47. The valve piston 201 is instantly moved to its extreme position toward the right upon admission of operating pressure fluid to the conduit 43, so that differential high pressure fluid is simultaneously supplied to the vane slot ports 47 at the time that operating pressure fluid is admitted to the ports 37. The spring-loaded one-way check valve 215, in the passage 216 that also connects the valve bore's enlarged end portion 204 with the conduit 43, remains closed and performs no function when the conduit 43 is connected with the source of operating pressure fluid.

The valve piston 200 is movable entirely independently of the valve piston 201 and, as already stated, said valve piston 200 controls the flow of fluid to and from the pair of vane slot ports 46 which are appropriately connected with the annular port 232 in the valve bore 202. Upon reversal of flow in the circuit so that the conduit 42 is connected with the exhaust conduit 38, pressure of the fluid in said conduit 42 will, of course, immediately drop to a very low amount, substantially zero in most instances, and the pressure of the fluid in the valve bore's enlarged end portion 220 will likewise drop but will never drop as low as the pressure in the conduit 42 when said conduit 42 is connected with the exhaust as will be presently explained. It will be observed that fluid is unable to escape from the valve bore's enlarged end portion 220 through the one-way check valve 221 in the passage 222 that leads to the conduit 42 and can escape to said conduit 42 only when it reaches a pressure sufficient to open the one-way spring-loaded check valve 223 in the passage 224. With the valve piston in a position toward the right, the port 232, and hence the pair of vane slot ports 46, are connected with the enlarged end portion 220.

As the pressure drops in the valve bore's enlarged end portion 220, the valve piston 200 will be immediately and correspondingly moved toward the right under influence of the spring 225 in the end 226 of the valve bore, said end 226 being connected with a passage 227, shown as broken off, which may lead to the atmosphere or to a reservoir, not shown, or may connect with the exhaust conduit 38. As the valve piston 200 moves toward the right, its reduced portion 228 intermediate its heads 229 and 230 progressively connects with the valve bore's annular port 231 which is continuously connected with the source of differential high pressure fluid, as by a passage 45' leading from the port 214 of the valve bore 203. The valve piston's reduced portion 228 is provided with a radial hole 233 that connects with an axial hole 234 extending through the end of the valve piston in the valve bore's enlarged end portion 220; the radial hole 233 and axial hole 234 are indicated by dotted lines on the valve piston 200 and the corresponding passages of the valve piston 201 are shown in the sectional view thereof in which they are designated by the same numerals. A groove or slot 235 on the end of each valve piston assures communication at all times between the axial hole 234 and the enlarged end portion of the corresponding valve bore. In this manner differential high pressure fluid from the port 231 may pass into the valve bore's enlarged end portion 220 to increase the pressure of the fluid therein and in the ports and passages connected therewith. Increase in pressure of the fluid in the valve bore's enlarged end portion 220 acts to move the valve piston 200 against the spring 225 and toward the left, however, and this movement tends to decrease the extent of connection between the port 231 and the valve piston's reduced portion 228, thus increasing the resistance to flow and reducing the amount of differential high pressure admitted to the end portion 220 and hence the pressure of the fluid therein. The valve piston 200 thus moves to admit sufficient differential high pressure fluid to the valve bore's enlarged end portion 220 to maintain therein and in the connected vane slot ports 46 a pressure determined by the spring 225; the spring 225 is made such that the pressure thus maintained is sufficient to provide satisfactory action of the vanes during "over-run" of the rotor at reversal while said vanes are moving in connection with the vane slot ports 46, the pressure thus maintained being less than the pressure required to open the one-way spring-loaded check valve 223.

Admission of differential high pressure fluid to the enlarged end portion 220 of the valve bore, as just described, takes place only during "over-run" of the rotor at reversal. When the rotor ceases to "over-run," or if no "over-run" occurs, and when the rotor begins to rotate in a counter-clockwise direction (under influence of operating pressure fluid in the ports 37) the inner ends of the vanes 17 will begin to discharge into the vane slot ports 46 as explained in connection with the embodiments of Figs. 1-8 and Fig. 9. Fluid thus discharged can escape from the valve bore's enlarged end portion 220 only through the spring-loaded check valve 223 and hence pressure is immediately built up in said enlarged end portion 220; this pressure acts first to move the valve piston 200 toward the left until its head 230 completely covers the port 231, thus cutting off all admission of differential high pressure fluid to the enlarged end portion 220. The pressure built up by the discharging inner ends of the vanes 17 then opens the check valve 223, and the arrangement is such that said check valve 223 does not open until the valve piston 200 has moved a distance toward the left sufficient for its head 230 to cover the port 231; upon opening of the check valve 223, fluid exhausted by the inner ends of the vanes 17 passes through the passage 224 and into the conduit 42. The pressure required to open the check valve 223 need not be high and may, in fact, be only a small amount above the pressure maintained by admission of differential high pressure fluid to the enlarged end portion 220 during "over-run," as will be understood from the example given in connection with the embodiment of Fig. 9. In this manner, quiet, satisfactory and efficient operation is obtained at all times, regardless of "over-run" of the rotor.

When the direction of fluid flow is reversed and operating pressure fluid is admitted to the conduit 42, the valve piston 200 will immediately move to its extreme position toward the left; the valve piston 201 will likewise move toward the left and will function in the same manner as already explained in connection with the valve piston 200 when the conduit 43 is connected with the source of operating pressure fluid.

A certain amount of internal leakage of fluid into the cavity of the casing 10 and adjacent the shaft 20 will occur in devices of this character, particularly when operated at relatively high pressures such as 1000 lbs. per sq. in. and the like. In the past it has been customary to collect such internal leakage fluid at some point in the casing and return it to the reservoir through a separate pipe or passage; this arrangement requires extra piping, etc. which is often inconvenient to install and adds to the total cost of installation of the motor. The reversible vane type motor of the present invention provides novel, simple and inexpensive means for returning such leakage fluid to the reservoir and one in which no extra piping or the like is required, as will now be described.

Referring to Fig. 1, fluid leaking radially outward from the high pressure fluid areas and past the vane track ring 25 is collected in the annular passages formed by the chamfered outer edges of the cheek plates 34 and 35, as indicated at 110 and 111 in Fig. 1. The chamfered passage 110 of the end head cheek plate 35 is connected with the chamfered passage 111 of the casing cheek plate 34 by a groove extending axially through said cheek plates and across the outer circumference of the vane track ring 25, this groove being indicated generally by the numeral 112. The outer face of the casing cheek plate 34 is also provided with a radial groove 113 extending from its chamfered edge 111 to the hole at its center, as shown in Fig. 1; the groove 113 is positioned intermediate the ports 36 and 37 and preferably on the vertical centerline as illustrated. All fluid leaking radially outward may thus pass to the hole at the center of the cheek plate 34 and into the space surounding the shaft 20. Fluid leaking radially inward toward the shaft 20 collects in the holes for said shaft 20 in the cheek plates 34 and 35, the fluid being free to pass axially along the shaft 20 in the spaces between the shaft splines 21 and the rotor splines 18 and may thus pass from the hole at the center of the end head cheek plate 35 to the hole at the center of the casing cheek plate 34. All leakage fluid thus passes to the space between the shaft 20 and the hole for said shaft at the center of the casing cheek plate 34 and then through the clearance for said shaft and through the bearing member 24.

Figure 4:
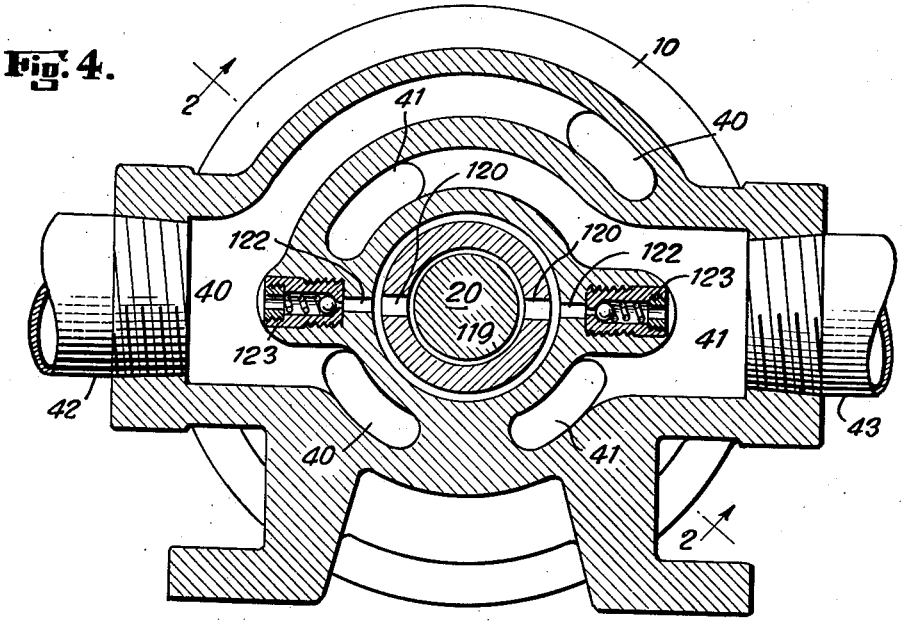
Fig. 4 is also a view in vertical transverse section but is taken along the lines 4—4 of Fig. 1 and looking in a direction opposite to that of Fig. 3.

As shown in Fig. 2, the space surrounding the shaft 20 intermediate the bearing members 23 and 24 is filled by an annular spacer member 115, shaft packing 116 and a gland 117. The spacer member 115 is provided with an annular recess 118 on its end adjacent the bearing 24 and this recess 118 connects with the relatively large clearance space 119 between the inner circumference of the spacer member 115 and the shaft 20. Leakage fluid is free to pass axially into the clearance space 119 but is prevented from further axial travel by the shaft packing 116. The spacer member 115 is also provided with radial holes 120 which connect the clearance space 119 with an annular groove or channel 121 on the outer circumference of said spacer member 115 as shown in Figs. 2 and 4.

The fluid channels 40 and 41 are each connected with the shaft bore in the casing 10 by a passage 122 (Fig. 4) which enters said shaft bore at a point to connect with the annular groove 121 on the outer circumference of the spacer member 115. Each passage 122 is provided intermediate its ends with a one-way check valve 123 which closes to prevent the passage of fluid from the corresponding fluid channel 40 or 41 into the shaft bore but opens to permit the passage of fluid in the opposite direction whenever the pressure of the fluid in said shaft bore slightly exceeds the pressure of the fluid in the corresponding fluid channel 40 or 41. With this arrangement, leakage fluid builds up only enough pressure to open the check valve 123 in the passage 122 leading to whichever of the fluid channels 40 or 41 is at the time the discharge or exhaust channel and connected with the exhaust conduit 38. This novel and simple arrangement thus provides for the return of leakage fluid to the reservoir without extra pipes and is very inexpensive; in practice it has proved entirely satisfactory.

While described and explained in connection with its use as a reversible vane type fluid motor, the fluid pressure device of the present invention will also function as a reversible pump if the shaft 20 is connected with driving means capable of operation in either direction of rotation. The term "fluid pressure device" as used in the appended claims is accordingly intended to include both reversible pumps and reversible fluid motors. When used as a pump, however, differential high pressure fluid cannot be provided by positioning a differential pressure or resistance valve in the supply line and such differential high pressure fluid must then be provided by other means such, for example, as the other means shown and fully explained in co-pending application Serial Number 198,449 to which reference has already been made.

It is to be understood that the foregoing are merely exemplifying disclosures and that changes, some of which have been indicated, may be made in the apparatus without departing from the invention which is defined in the appended claims.

I claim:

1. In a reversible rotary vane type fluid motor having a rotor provided with a plurality of vanes movable inwardly and outwardly thereof in a substantially radial direction, a casing therefor including a track for guiding the vanes in their in and out movement and provided with two diametrically opposed working chambers, each working chamber having on opposite circumferential sides thereof two fluid areas either of which may be the high pressure area and the other of which will then be the low pressure area, each working chamber extending in a circumferential direction a distance substantially equal to the distance between the outer ends of a pair of adjacent vanes when in contact with the portion of the track in said chamber and each of said chambers functioning as the working chamber for whichever of the areas on its opposite circumferential sides is the high pressure area, said chambers and areas being positioned adjacent the rotor whereby the radially outer ends of said vanes are subjected to the respective pressures of the fluid therein as they pass therethrough, means for connecting either of the two fluid areas adjacent one of said working chambers and the diametrically opposed fluid area adjacent the other of said working chambers with working pressure fluid to thereby make them the high pressure areas and means for supplying to the inner ends of those vanes during only but throughout the entire time that the outer ends thereof are passing through said high pressure areas and said working chambers fluid having a pressure greater than but related to the pressure of said working pressure fluid.

2. In a reversible rotary vane type fluid motor, a casing enclosing a track for guiding the vanes in their inward and outward movement and having interchangeable fluid inlet and outlet areas, a conduit for supplying working pressure fluid to said motor, a separate conduit for supplying to said motor fluid having a pressure higher than that of said working pressure fluid, means for connecting either of said areas with said working pressure fluid conduit to make it the inlet area and the other of said areas with the exhaust and means for connecting the inner ends of the vanes with the higher pressure conduit during the time that the outer ends of said vanes are passing through the inlet area, with the inner ends of the other vanes connected with the exhaust during the time that the outer ends thereof are passing through the outlet area.

3. In a reversible rotary vane type fluid motor, a casing including a track for guiding the vanes in their inward and outward movement and provided with interchangeable fluid inlet and outlet areas, interchangeable admission and discharge ports arranged to connect successively with the inner ends of the vanes, means for supplying two fluid pressures one a working and the other a higher pressure, fluid flow control means for directly connecting either of said areas with the working fluid pressure to make it the inlet area and the other of said areas with the exhaust, and means cooperating with said ports for connecting the inner ends of the vanes with the higher pressure during the time that the outer ends of said vanes are passing through the inlet area, with the inner ends of the vanes connected with the exhaust during the time that the outer ends thereof are passing through the outlet area.

4. In a reversible rotary vane type fluid pressure device having a rotor provided with a plurality of vanes movable inwardly and outwardly thereof, a casing therefore including a track for guiding the vanes in their in and out movement and provided with interchangeable fluid inlet and outlet areas either of which may be the inlet area and the other of which will then be the outlet area together with means for effecting interchange, said areas being positioned adjacent the rotor whereby the outer ends of the vanes are subjected to the respective pressures of the fluid therein as they pass therethrough, interchangeable admission and discharge ports arranged to connect successively with the inner ends of the vanes as the rotor revolves, and valve means cooperating with said ports for connecting the inner ends of said vanes with the exhaust during the time that the outer ends thereof are passing through whichever of said areas is at the time the outlet area and for simultaneously supplying to the inner ends of the vanes during the time that the outer ends thereof are passing through the other of said areas which is then the inlet area fluid under pressure higher than the pressure of the fluid acting on the outer ends of said vanes in said last named area.

5. In a reversible rotary van type fluid pressure device having a plurality of fluid sections, each fluid section comprising a working chamber having on the opposite circumferential ends thereof two fluid areas either of which may be the high pressure area and the other of which will then be the low pressure area, one circumferential end of each fluid section being separated from the contiguous fluid section by a sealing chamber, a rotor having a plurality of vanes movable inwardly and outwardly thereof in a substantially radial direction, the outer ends of said vanes being subjected to the pressure of the fluid in said chambers and said fluid areas while passing therethrough, a vane track surrounding said rotor and said vanes and adapted to contact the outer ends of said vanes to guide and control said vanes in their in and out movement, a separate vane slot port for each of said chambers arranged to connect with the inner ends of the vanes while the outer ends thereof are passing through the corresponding chamber, means active to supply to the inner ends of those vanes whose outer ends are passing through whichever fluid area of each fluid section is at the time its high pressure area differential high pressure fluid having a pressure greater than but correlated with the pressure admitted to that fluid area and for simultaneously connecting with the exhaust the inner ends of those vanes whose outer ends are passing through the other area of each fluid section which is then its low pressure area, and means for continuously supplying said differential high pressure fluid to each of said vane ports.

6. In a reversible rotary vane type fluid pressure device having a rotor provided with a plurality of vanes movable inwardly and outwardly thereof, a casing therefor including a vane track for guiding the vanes in their in and out movement and provided adjacent the rotor with a working chamber having on the circumferential sides thereof two fluid areas either of which may be the high pressure area and the other of which will then be the low pressure area, a sealing chamber separating one circumferential side of each fluid area from the contiguous circumferential side of the adjacent fluid area, the outer ends of said vanes being subjected to the respective pressures in said working and sealing chambers and in said fluid areas while passing therethrough, and valve connecting and disconnecting means active to supply to the inner ends of those vanes whose outer ends are passing through said working chambers, said sealing chambers and whichever fluid area is at the time the high pressure area fluid having a pressure greater than but correlated with the pressure of the fluid in said high pressure fluid area and for simultaneously connecting with the exhaust the inner ends of those vanes whose outer ends are passing through said other fluid area which is then the low pressure area, said valve means including at least one element shiftable from one position to another and having porting means controlling solely the flow of fluid to and from the inner ends of said vanes.

7. In a reversible rotary vane type fluid pressure device having a rotor including a plurality of vanes movable inwardly and outwardly thereof in a substantially radial direction, a casing therefor including a track for guiding the vanes in their in and out movement and provided with two diametrically opposed working chambers, each working chamber having on opposite circumferential sides thereof two fluid areas either of which areas may be the high pressure area and the other of which will then be the low pressure area, each of said chambers extending in a circumferential direction for an arcuate distance substantial equal to the angular distance between a pair of adjacent vanes and functioning as the working chamber for whichever of said areas on the opposite circumferential sides thereof is at the time the high pressure area, said chambers and areas being positioned adjacent the rotor whereby the radially outer ends of said vanes are subjected to the respective pressures therein as they pass therethrough, means for continuously supplying to the inner ends of the vanes throughout the time that the outer ends thereof are passing through said working chambers fluid having a pressure greater than but correlated with the pressure of the fluid in whichever of said areas are at the time the high pressure areas, and means active to supply to the inner ends of those vanes whose outer ends are passing through the two areas that at the time are high pressure areas the fluid having said pressure greater than but correlated with the pressure of the fluid in said high pressure areas and for simultaneously connecting with the exhaust the inner ends of those vanes whose outer ends are passing through the two areas that at the time are the low pressure areas.

8. In a reversible rotary vane type fluid pressure device having a rotor provided with a plurality of vanes movable inwardly and outwardly thereof, a casing therefor including a track for guiding the vanes in their in and out movement and provided with interchangeable fluid inlet and outlet areas either of which may be the inlet area and the other of which will then be the outlet area, said areas being positioned adjacent the rotor whereby the outer ends of the vanes are subjected to the respective pressures of the fluid therein as they pass therethrough, and valve means including at least one element movable responsive to difference in pressures existing in said areas for connecting the inner ends of said vanes with the exhaust during the time that the outer ends thereof are passing through whichever of said areas is at the time the outlet area and for simultaneously supplying to the inner ends of the vanes during the time that the outer ends thereof are passing through the other of said areas which is then the inlet area fluid under pressure higher than but related to the pressure of the fluid acting on the outer ends of said vanes in said last named area.

9. In a reversible rotary vane type fluid motor, a casing including a track for guiding the vanes in their inward and outward movement and provided with interchangeable fluid inlet and outlet areas, means for supplying two fluid pressures one a working and the other a higher pressure, means for connecting either of said areas with working fluid pressure to make it the inlet area and the other of said areas with the exhaust and means including an element movable responsive to difference in pressures existing in said areas for connecting the inner ends of the vanes with the higher pressure during the time that the outer ends of said vanes are passing through the inlet area, with the inner ends of the vanes connected with the exhaust during the time that the outer ends thereof are passing through the outlet area.

10. In a reversible rotary vane type fluid motor having a rotor provided with a plurality of vanes movable inwardly and outwardly thereof in a substantially radial direction, a casing therefor including a vane track for guiding the vanes in their in and out movement and having two fluid areas adjacent the rotor whereby the outer ends of said vanes are subjected to the respective pressures therein as they pass therethrough, said fluid areas being interchangeably connectable to make either one of them the high pressure area and the other of them the low pressure area, the direction of rotation of said rotor being reversed by said interchange and said rotor tending upon said interchange to momentarily overrun and to continue to rotate in the direction of its rotation prior to said interchange, means active upon said interchange to supply to the inner ends of those vanes whose outer ends are passing through the high pressure area fluid under pressure greater than but correlated with the pressure of the fluid in said high pressure area, and, during over-run of said rotor, for supplying to the inner ends of those vanes whose outer ends are passing through the low pressure area fluid having a pressure less than the pressure of the fluid in the high pressure area but greater than the pressure in the low pressure area to urge said vanes into contact with said vane track independent of the action of centrifugal force.

11. In a reversible rotary vane type fluid motor having a rotor provided with a plurality of vanes movable inwardly and outwardly thereof in a substantially radial direction, a casing therefor including a vane track for guiding the vanes in their in and out movement and having two fluid areas adjacent the rotor whereby the outer ends of said vanes are subjected to the respective pressures therein as they pass therethrough, said fluid areas being interchangeably connectable to make either one of them the high pressure area and the other of them the low pressure area, the direction of rotation of said rotor being reversed by said interchange and said rotor tending upon said interchange to momentarily over-run and to continue to rotate in the direction of its rotation prior to said interchange, means automatically active upon said interchange to supply to the inner ends of those vanes whose outer ends are passing through the high pressure area fluid under pressure greater than but correlated with the pressure of the fluid in said high pressure area, and, during over-run of said rotor, for supplying to the inner ends of those vanes whose outer ends are passing through the low pressure area fluid under a relatively low predetermined pressure active to urge said vanes into contact with said vane track, and means permitting the exhaust of fluid discharged by the inner ends of those vanes whose outer ends are passing through said low pressure area upon cessation of over-run of said rotor and commencement of its rotation in the reversed direction.

12. In a reversible rotary vane type fluid motor having a rotor provided with a plurality of vanes movable inwardly and outwardly thereof in a substantially radial direction, a casing therefor including a vane track for guiding the vanes in their in and out movement and having two fluid areas adjacent the rotor whereby the outer ends of said vanes are subjected to the respective pressures therein as they pass therethrough, said fluid areas having connections interchangeable to make either one of them the high pressure area and the other of them the low pressure area, the direction of rotation of said rotor being reversed upon interchange of high pressure from one of said areas to the other and corresponding interchange of low pressure areas but said rotor tending upon such interchange to momentarily over-run and to continue to rotate in the direction of its rotation prior to said interchange, means active upon said interchange to supply to the inner ends of those vanes whose outer ends are passing through the high pressure area differential high pressure fluid under pressure greater than but related to the pressure of the fluid in said high pressure area and means for supplying during over-run of said rotor an auxiliary force active to move said vanes into contact with the vane track as the outer ends thereof pass through said low pressure area, said auxiliary force being of a magnitude sufficient to move said vanes into contact with said vane track but insufficient to produce heavy rubbing action of said vanes against said vane track.

13. In a reversible rotary vane type fluid motor having a rotor provided with a plurality of vanes movable inwardly and outwardly thereof, a casing therefor including a track for guiding the vanes in their in and out movement and provided with interchangeable fluid inlet and outlet areas either of which may be the inlet area and the other of which will then be the outlet area, said areas being positioned adjacent the rotor whereby the outer ends of the vanes are subjected to the respective pressures of the fluid therein as they pass therethrough, a vane slot port adapted to connect with the inner ends of those vanes whose outer ends are passing through one of said areas, a separate vane slot port adapted to connect with the inner ends of those vanes whose outer ends are passing through the other of said areas, a valve bore having separate ports therein separately connected with said vane slot ports, a fluid admission port in said valve bore connected with a supply of fluid having a pressure higher than but related to the pressure of the fluid in whichever of said areas is at the time the inlet area, a fluid connection between one end of said valve bore and one of said areas and another fluid connection between the other end of said valve bore and the other of said areas, and a valve piston in said valve bore having its ends continuously exposed to fluid admitted to the ends of said valve bore from said areas, whereby said valve piston is instantly moved to and maintained in one of its two extreme positions of movement in said valve bore responsive to difference in pressures of fluid therein, said valve piston establishing when in said extreme positions fluid connection between said fluid admission port and the port in said valve bore that is connected with the inner ends of those vanes whose outer ends are passing through whichever of said areas is at the time the inlet area and also establishing direct and unobstructed fluid connection between the passage in the end of said valve bore leading to said other area and the port in said valve bore connected with the inner ends of those vanes whose outer ends are passing through the other of said areas which is the outlet area.

14. In a reversible rotary vane type fluid motor having a rotor provided with a plurality of vanes movable inwardly and outwardly thereof, a casing therefor including a vane track for guiding the vanes in their in and out movement and provided adjacent the rotor with a working chamber having on the circumferential sides thereof two fluid areas either of which may be the inlet area and the other of which will then be the outlet area, said working chamber extending in a circumferential direction a distance substantially equal to the distance between the outer ends of a pair of adjacent vanes when in contact with the portion of the vane track in said chamber, means for connecting either of said areas with working pressure fluid to thereby make it the inlet area and means for supplying to the inner ends of at least certain of the vanes fluid under pressure slightly higher than the pressure of said working pressure fluid, said means including a vane slot port adapted to connect with the inner ends of those vanes whose outer ends are passing through one of said areas, a separate vane slot port adapted to connect with the inner ends of those vanes whose outer ends are passing through the other of said areas, a valve bore having separate ports therein separately connected with said vane slot ports, a fluid admission port in said valve bore connected with a supply of fluid having a pressure higher than but related to the pressure of the fluid in whichever of said areas is at the time the inlet area, and piston valve means in said valve bore active to connect said fluid admission port with the port in said valve bore which is connected with that vane slot port which is in connection with the inner ends of those vanes whose outer ends are passing through whichever of said areas is at the time the inlet area.

15. In a reversible vane type fluid motor having a rotor provided with a plurality of vanes movable inwardly and outwardly thereof, a casing therefor including a track for guiding the vanes in their in and out movement and provided with interchangeable high and low pressure fluid areas adjacent the rotor whereby the outer ends of said vanes are subjected to the respective pressures of the fluid therein as they pass therethrough, a vane slot port adapted to connect with the inner ends of those vanes whose outer ends are passing through one of said areas, a separate vane slot port adapted to connect with the inner ends of those vanes whose outer ends are passing through the other of said areas, a valve bore having separate ports therein separately connected with a supply of fluid having a pressure greater than but related to the pressure of the fluid admitted to whichever of said areas is at the time the high pressure area, a valve piston in said valve bore having its ends continuously exposed to the respective pressures in said areas whereby said valve piston is instantly moved to and maintained in one of its two extreme positions of movement in said valve bore responsive to difference of pressure in said areas, said valve piston establishing when in said extreme positions fluid connection between said fluid admission port and the vane slot port that is connected with the inner ends of those vanes whose outer ends are passing through whichever of the areas is at the time the high pressure area, and also establishing fluid connection between said other vane slot port and the end of the valve bore adjacent the end of said valve piston exposed to pressure of fluid in the low pressure area, an auxiliary pump, means for maintaining the fluid discharged by said auxiliary pump at a substantially constant pressure, a fluid connection between said last named end of said valve bore and the discharge of said auxiliary pump, a check valve in said last named fluid connection adapted to open to admit pressure fluid from said pump to said end of said valve bore but preventing the passage of fluid in the opposite direction, and a fluid connection between said last named end of said valve bore and said low pressure area and having a check valve adapted to open at a pressure greater than the pressure of the fluid discharged by said auxiliary pump.

16. In a reversible rotary vane type fluid motor having a rotor provided with a plurality of vanes movable inwardly and outwardly thereof in a substantially radial direction, a casing therefor including a vane track for guiding the vanes in their in and out movement and having two fluid areas adjacent the rotor whereby the outer ends of said vanes are subjected to the respective pressures therein as they pass therethrough, said fluid areas being interchangeably connectable to make either one of them the high pressure area and the other of them the low pressure area, the direction of rotation of said rotor being reversed by said interchange and said rotor tending upon said interchange to momentarily over-run and to continue to rotate in the direction of its rotation prior to said interchange, means active upon said interchange to supply to the inner ends of those vanes whose outer ends are passing through the high pressure area fluid under pressure greater than but correlated with the pressure of the fluid in said high pressure area, and, during over-run of said rotor, for supplying to the inner ends of those vanes whose outer ends are passing through the low pressure area fluid having a pressure less than the pressure of the fluid in the high pressure area but greater than the pressure in the low pressure area to urge said vanes into contact with said vane track independent of the action of centrifugal force, said last named means including an auxiliary pump for supplying pressure fluid to the inner ends of those vanes whose outer ends are passing through said low pressure area during over-run to urge said vanes into contact with the vane track.

17. In a reversible rotary vane type fluid motor having a rotor provided with a plurality of vanes movable inwardly and outwardly thereof in a substantially radial direction, a casing therefor including a vane track for guiding the vanes in their in and out movement and having two fluid areas adjacent the rotor whereby the outer ends of said vanes are subjected to the respective pressures therein as they pass therethrough, said fluid areas being interchangeably connectable to make either one of them the high pressure area and the other of them the low pressure area, the direction of rotation of said rotor being reversed by said interchange and said rotor tending upon said interchange to momentarily over-run and to continue to rotate in the direction of its rotation prior to said interchange, means active upon said interchange to supply to the inner ends of those vanes whose outer ends are passing through the high pressure area fluid under pressure greater than but correlated with the pressure of the fluid in said high pressure area, and, during over-run of said rotor, for supplying to the inner ends of those vanes whose outer ends are passing through the low pressure area fluid having a pressure less than the pressure of the fluid in the high pressure area but greater than the pressure in the low pressure area to urge said vanes into contact with said vane track independent of the action of centrifugal force, said last named means including a vane slot port adapted to connect with the inner ends of those vanes whose outer ends are passing through one of said fluid areas, a separate vane slot port adapted to connect with the inner ends of those vanes whose outer ends are passing through the other fluid area and separate piston means for controlling the flow of fluid to and from each of said vane slot ports.

18. In a reversible rotary vane type fluid motor having a rotor provided with a plurality of vanes movable inwardly and outwardly thereof, a vane track for guiding the vanes in their in and out movement and provided adjacent the rotor with a working chamber having on the opposite circumferential sides thereof two fluid areas either of which may be the inlet area and the other of which will then be the outlet area, a separate port positioned to connect with the inner ends of the vanes during only the time that the outer ends thereof are passing through said chamber, means for connecting either of said areas with the working pressure fluid supply to thereby make it the inlet area and means for continuously supplying to said port fluid having a pressure greater than but related to the pressure of the working pressure fluid.

19. In a rotary vane type fluid pressure device, a rotor having a plurality of vanes movable inwardly and outwardly thereof, a track for guiding the vanes in their in and out movement and provided adjacent the rotor with a working chamber having an inlet area and an outlet area on the opposite circumferential sides thereof, one of said areas containing working pressure fluid, a port arranged to connect with the inner ends of said vanes during only the time that the outer ends thereof are passing through said chamber, means for continuously supplying to said port fluid having a pressure related to but different from that of said working pressure fluid and means for supplying to the inner ends of the vanes during the time that the outer ends thereof are passing through the inlet area fluid having a pressure greater than the pressure of the fluid in said inlet area.

20. In a reversible rotary vane type fluid pressure device, a rotor having a plurality of vanes movable inwardly and outwardly thereof, a vane track for guiding said vanes in their in and out movement, a first fluid area and a second fluid area either of which may be the inlet area and the other of which will then be the outlet area, said areas being positioned adjacent said track and said rotor whereby the outer ends of the vanes are subjected to the respective pressures therein as they pass therethrough, a separate vane slot port for each area arranged to connect with the inner ends of the vanes while the outer ends thereof are passing through the corresponding area, control valve means for said vane slot ports and provided with a valve bore, fluid connections between said valve bore and each of said areas, separate ports in said valve bore for each of said vane slot ports and separately connected therewith, a fluid admission port continuously connected with a source of pressure fluid having a pressure greater than that of the fluid in whichever of the areas is the inlet area, and a valve element in said bore movable responsive to difference of pressures in said areas and active to connect said fluid admission port with the vane slot port for whichever of said areas is at the time the inlet area and to connect the vane slot port for the other of said areas with the discharge.

21. In a reversible rotary vane type fluid motor, a rotor having a plurality of vanes movable inwardly and outwardly thereof, a vane track for guiding the vanes in their in and out movement and provided with circumferentially separated working and sealing arcs, a first fluid area and a second fluid area either of which may be the high pressure area and the other of which will then be the low pressure area, said areas being disposed intermediate said working and sealing arcs and positioned adjacent said track and said rotor whereby the outer ends of the vanes are subjected to the respective pressures therein as they pass therethrough, a separate vane slot port for each of said areas arranged to connect with the inner ends of the vanes while the outer ends thereof are passing through the corresponding area, intermediate vane slot ports disposed circumferentially between said first named vane slot ports and arranged to connect with the inner ends of the vanes while the outer ends thereof are traversing respectively the working and sealing arcs and valve mechanism controlling the flow of fluid to and from said vane slot ports, said valve mechanism comprising a valve bore, fluid connections between said valve bore and each of said areas, separate ports in said valve bore for each of said first named vane slot ports and separately connected therewith, a fluid admission port continuously connected with a source of pressure fluid having a pressure greater than that of the fluid in whichever of said areas is the high pressure area, a valve element in said bore movable responsive to difference of pressures in said areas and active to connect said fluid admission port with the vane slot port for whichever of said areas is at the time the high pressure area and to connect the other of said named vane slot ports with the other of said areas for the discharge of fluid therethrough, and fluid connections between said admission port and said intermediate vane slot ports to continuously supply thereto said fluid of said greater pressure.

22. In a reversible rotary vane type fluid motor, a casing including a track for guiding the vanes in their inward and outward movement and provided with interchangeable fluid inlet and outlet areas, means for supplying two fluid pressures one a working and the other a higher pressure, fluid flow control means for connecting either of said areas with working fluid pressure and the other of said areas with the exhaust, and means for connecting the inner ends of the vanes with the higher pressure fluid during the time that the outer ends of said vanes are passing through the area connected with said working pressure fluid and for connecting the inner ends of the vanes with the other of said areas for the exhaust of fluid therethrough during the time that the outer ends of said vanes are passing through said last named area.

23. In a reversible rotary vane type fluid pressure device having a rotor provided with a plurality of vanes movable inwardly and outwardly thereof, a casing therefor including a track for guiding the vanes in their in and out movement and provided with interchangeable fluid inlet and outlet areas either of which may be the inlet area and the other of which will then be the outlet area together with means for effecting interchange, said areas being positioned adjacent the rotor whereby the outer ends of the vanes are subjected to the respective pressures of the fluid therein as they pass therethrough, interchangeable admission and discharge ports arranged to connect successively with the inner ends of said vanes as the rotor revolves and valve means cooperating with said ports for connecting the inner ends of said vanes with the exhaust during the time that the outer ends thereof are passing through whichever of said areas is at the time the outlet area and for simultaneously supplying to the inner ends of the vanes during the time that the outer ends thereof are passing through the other of said areas which is then the inlet area fluid under pressure sufficient to overcome the force exerted on the vanes in an inward direction by the fluid pressure to which the outer ends are exposed.

CHARLES M. KENDRICK.